United States Patent [19]

Murai et al.

[11] 4,451,370

[45] May 29, 1984

[54] MEMBRANE SEPARATION ELEMENT

[75] Inventors: Masataka Murai; Kiyoshi Ishii, both of Himeji, Japan

[73] Assignee: Daicel Chemical Industries Ltd., Hyogo, Japan

[21] Appl. No.: 388,236

[22] Filed: Jun. 14, 1982

[30] Foreign Application Priority Data

Jun. 19, 1981 [JP] Japan .................. 56-95469

[51] Int. Cl.$^3$ ............................................ B01D 31/00
[52] U.S. Cl. .............................. 210/321.1; 210/433.2
[58] Field of Search .................. 210/321.1, 500.2, 487, 210/493.1, 321.5, 346, 433.2, 456

[56] References Cited

U.S. PATENT DOCUMENTS 2,982,416  5/1961  Bell ................................. 210/321.1
3,578,173  5/1971  Streeton ........................ 210/500.2
3,746,175  7/1973  Markley ........................ 210/321.1

Primary Examiner—Frank A. Spear, Jr.
Attorney, Agent, or Firm—Hubbell, Cohen, Stiefel & Gross

[57] ABSTRACT

The present invention provides a membrane separation element comprising a pair of corrugated semipermeable membranes each defining a plurality of parallel passages for the fluid to be treated on active surface side thereof, and a plurality of parallel passages for a filtrate fluid on the other side thereof, said membrane being placed on each other in such a manner that the passages on the active surface side of one of said membranes may face and cross the passages on the active surface side of another membrane, said membranes being sealed together along a pair of opposite edges.

12 Claims, 9 Drawing Figures

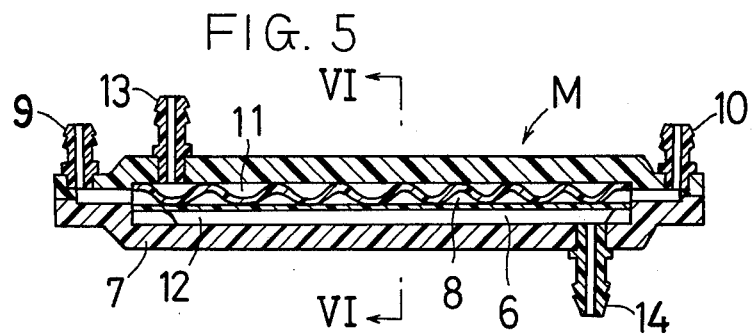
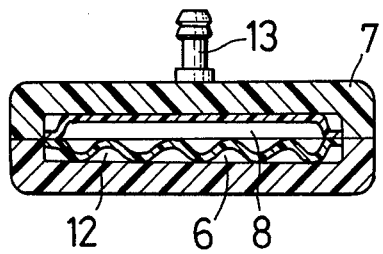
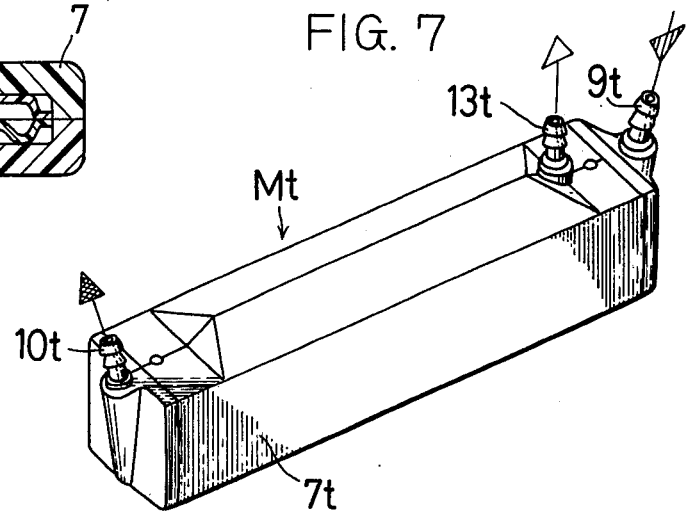
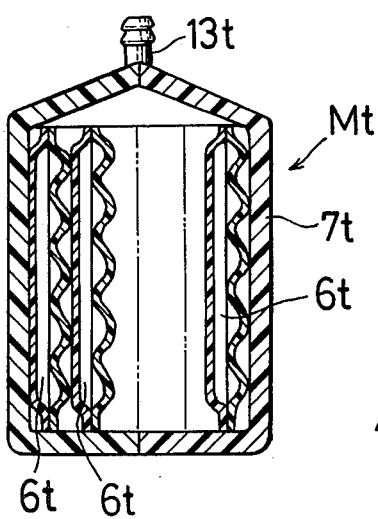
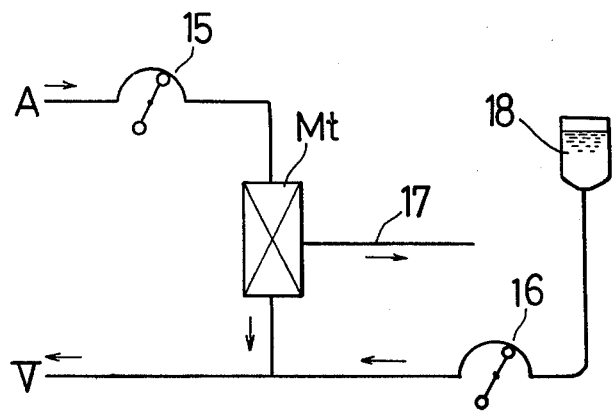

MEMBRANE SEPARATION ELEMENT

BACKGROUND OF THE INVENTION

1. Field of the Invention

This invention relates to a membrane separation element which is, for example, used for the filtration or concentration of a fluid, and which is particularly suitable for use in artificial internal organs, more particularly in an artificial kidney for the treatment of blood.

2. Description of the Prior Art

There are known various types of separation devices or modules having semipermeable membrane separation elements. They are classified by the shape of the membrane separation element into, for example, spirally wound type, plate and frame type, and pleated type. A known membrane separation element comprises two flat membranes positioned in mutually spaced apart relationship to define a passage for the fluid to be treated therebetween, and a spacer disposed between the membranes, as disclosed, for example, in Published unexamined Japanese Patent Application Nos. 109405/1980 and 167008/1980.

A more recently known membrane separation element comprises a flat membrane and a corrugated membrane, and does not require any spacer between the membranes, as disclosed, for example, in U.S. Pat. No. 3,401,798. This construction provides an enlarged membrane surface area for the treatment of a fluid, and provides many parallel passages extending in the direction of flow of the fluid to be treated, thereby enabling its uniform distribution and flow so that the element may have an improved filtration efficiency. These advantages are, however, not always obtainable. Although a reduction in the cost of the element by the elimination of the spacer, and the enlarged membrane surface may be obtained, the uniformity in distribution of the fluid through the element depends largely on whether the passages are uniformly sized in cross section at the fluid inlet of the element. If such is not the case, no uniform distribution can be obtained, resulting in a lower separation efficiency of the element, since the fluid entering one of the passages flows through only that passage until it leaves the element.

SUMMARY OF THE INVENTION

As a result of extensive research, the inventors of this invention have found it possible to overcome the aforesaid disadvantages if a pair of corrugated membranes is employed. The membranes are disposed one against the other in such a manner that the parallel fluid passages defined by one of the membranes cross those defined by the other membrane.

This invention provides a membrane separation element comprising a pair of corrugated semipermeable membranes each defining a plurality of parallel passages for the fluid to be treated on the active surface side thereof, and a plurality of parallel passages for a filtrate fluid on the other side thereof, the membranes being placed one upon the other in such a manner that the passages on the active surface side of one membrane face and cross the passages on the active surface side of the other membrane, the membranes being sealed together along a pair of opposite edges which run along the direction in which the fluid to be treated flows into its passages.

The membrane separation element of this invention comprises a pair of semipermeable membranes which are both corrugated. The corrugations of each membrane define a plurality of parallel passages for the fluid to be treated on the active surface sides of the membranes. The two membranes are placed on each other so that their passages for the fluid to be treated face and cross each other.

This construction ensures that the fluid to be treated is repeatedly divided and joined as it flows along the mutually crossing passages between the two membranes. Even if the passages for the fluid to be treated are not uniformly sized in cross section, there is substantially no disuniformity in the distribution of the fluid, but the fluid to be treated is brought into contact with the entire membrane surfaces, whereby an improved separation efficiency is obtained. The element of this invention is simple in construction and inexpensive, since no spacer is required, and since the two membranes are of the same type.

It is preferable that the semipermeable membranes be regularly corrugated or have parallel linear ribs. Their corrugations may have a height of about 50 to 400 microns, and a pitch of about 600 to 3000 microns. While the corrugated membranes may be directly manufactured, it is also possible, for example, to emboss a flat membrane with a corrugate pattern by applying heat and pressure thereto.

Each membrane may comprise a backing which may, for example, be a woven fabric, a non woven fabric or a net of polyethylene terephthalate and/or cellulose acetate fiber, to be appropriately corrugated. A solution of synthetic high molecular substance, such as cellulose acetate, cellulose acetate butyrate, an acrylonitrile copolymer, or a polyimide, is cast on the corrugated backing to form a semipermeable film having a thickness of about 50 to 200 microns thereon. The backing and the semipermeable film may have a combined thickness of about 100 to 400 microns. If the semipermeable film is a wet film, its moisture may be partly replaced with glycerin, or the like.

The passages for the fluid to be treated on one membrane and those on the other membrane may cross each other at an angle of about 30° to 90°, or more preferably 45° to 90°.

The two membranes are sealed together by melt sealing along a pair of opposite edges which are along to the direction in which the fluid to be treated flows into the element, whereby a flattened tubular, or envelope-shaped membrane separation element is obtained. The element may have a gradually varying transverse width between its sealed edges to suit any variation in the quantity of the fluid to be treated, or its flow rate. This gradual variation also assists the formation of a compact element. No such width variation is possible in an element comprising a flat membrane and a corrugated one, or a combination of two flat membranes and a corrugated spacer, since some of the passages for the fluid to be treated would have a dead end. According to this invention, the transverse width of the element may be gradually increased or decreased, or alternatively, the element may be shaped like a disk as a whole.

BRIEF DESCRIPTION OF THE DRAWINGS

FIG. 5 is a longitudinal sectional view of the module shown in FIG. 4;

FIG. 6 is a transverse sectional view taken along the line VI—VI of FIG. 5;

FIG. 7 is a perspective view of another separation module;

FIG. 8 is a transverse sectional view of the module shown in FIG. 7; and

FIG. 9 is a diagram illustrating the operation of the module shown in FIG. 7.

DESCRIPTION OF THE PREFERRED EMBODIMENTS

Figure 1:
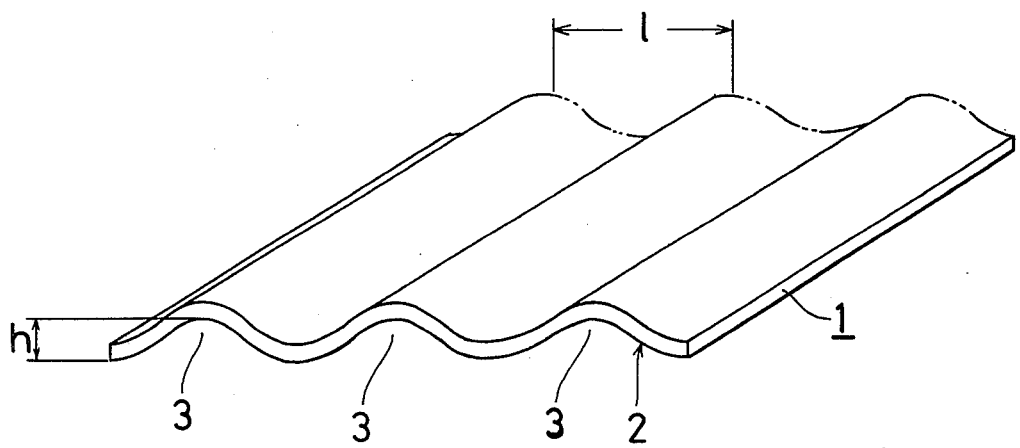
FIG. 1 is a fragmentary perspective view of a corrugated semipermeable membrane which may be used to form a membrane separation element according to this invention.

Referring first to FIG. 1 of the drawings, there is shown a corrugated semipermeable membrane 1 having an appropriate corrugation pitch 1 and an appropriate corrugation height h, and formed with a plurality of parallel passages 3 on the active surface side 2 thereof. A membrane separation element embodying this invention comprises a pair of corrugated semipermeable membranes placed on each other in such a manner that the passages 3 on one membrane 1 may face and cross the passages on the other similar membrane. The two membranes similar to 1 are sealed together along a pair of opposite edges (4 in the following FIG. 2) which are parallel to the direction of flow in which the fluid to be treated flows.

Figure 2:
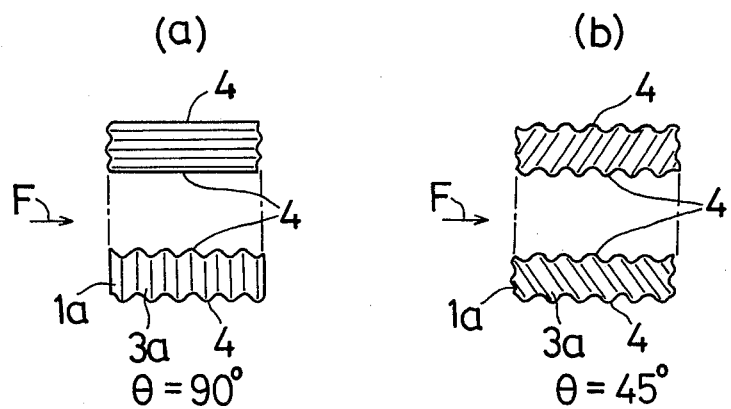
FIG. 2(a) is a view illustrating the manner in which a pair of semipermeable membranes are placed on each other in which one membrane is parallel and the other is perpendicular to the direction of fluid flow.
FIG. 2(b) is a view illustrating a pair of semipermeable membranes placed on each other in which one membrane is oblique by 45° and the other is oblique by −45° to the direction of fluid flow.

FIG. 2 shows two examples of the manner in which the two membranes are combined. In both cases, the fluid passages on one membrane cross those on the other at an angle of 90°. In an arrangement shown at (a), the fluid passages 3a on the lower membrane 1a have an angle θ of 90° to the direction of fluid flow F into the element, while the angle θ is 45° at (b).

Figure 3:
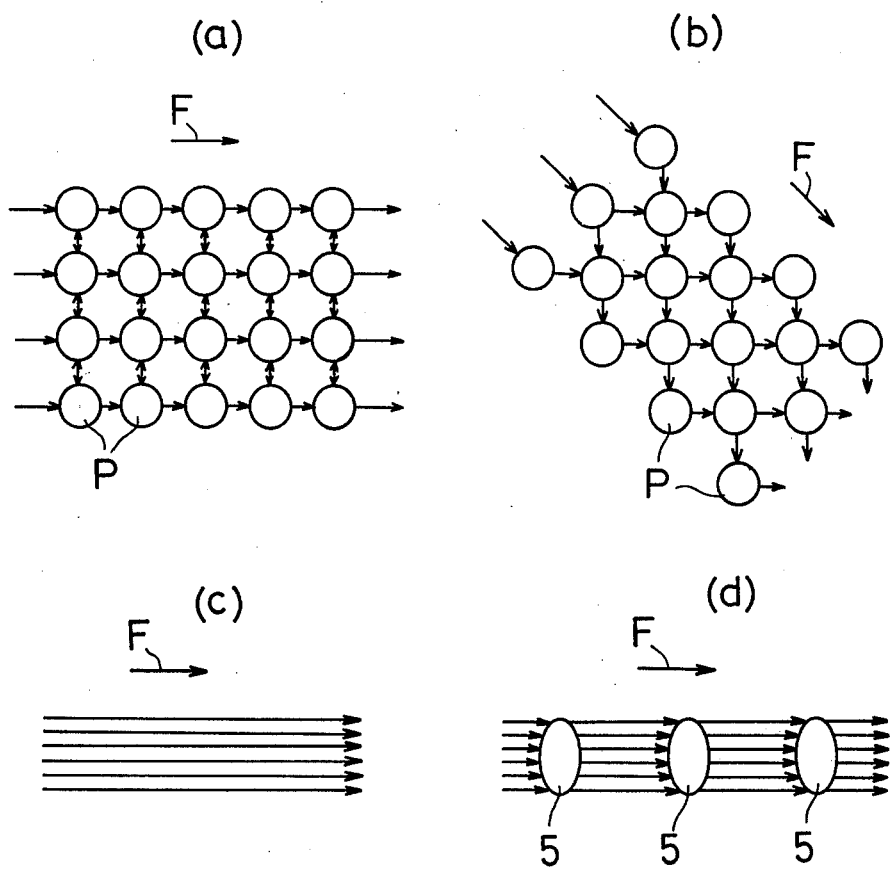
FIGS. 3(a) and 3(b) illustrate patterns of flow of a fluid in the device of this invention shown in FIGS. 2(a) and 2(b) respectively.
FIG. 3(c) illustrates the patterns of flow in a conventional device having no crossing fluid passages.
FIG. 3(d) illustrates the pattern of flow in a conventional device having a plurality of transversely communicating passages across the passages.

In FIG. 3, views (a) and (b) show the patterns of fluid flow through the membrane separation elements of this invention shown at (a) and (b) in FIG. 2, while views (c) and (d) show the patterns of fluid flow through conventional devices having fluid passages which do not cross each other. The device shown at (d) includes a plurality of transverse passages 5 connecting the longitudinally extending fluid passages.

In the devices of this invention, the fluid to be treated flows in the directions of arrows, while being repeatedly divided and joined at the intersections P of the fluid passages, as shown at (a) and (b) in FIG. 3. Therefore, even if the fluid passages are not uniformly sized in cross section, there is no appreciable disuniformity in fluid distribution, but the fluid to be treated is brought into contact with the entire membrane surfaces, whereby an improved separation efficiency is achieved.

In a device having no mutually crossing fluid passages, as disclosed, for example, in U.S. Pat. No. 3,401,798, the fluid entering one of the passages is confined therein until it leaves the device. As there is no communication between the passages, the shape, dimension and the accuracy of the fluid passages have a critical bearing on the flow of the fluid. The pattern of fluid flow in such a device is shown at (c) in FIG. 3.

The pattern shown at (d) in FIG. 3 is of the fluid flow in the device disclosed in Published unexamined Japanese Patent Application Nos. 109405/1980 and 167008/1980. The device includes a plurality of transversely communicating passages 5 provided at least close to the inlet and the outlet of the longitudinally extending fluid passages. Although the fluid is combined and redistributed by the transverse passages 5, the pattern of fluid flow from one transverse passage 5 to another is equal to that shown at (c) in FIG. 3, and the problems stated above still exists.

In the membrane separation element of this invention, the two membranes contact each other only at a plurality of discrete points; therefore, the fluid to be treated is brought into contact with substantially the entire membrane surfaces. No strict accuracy is required in the shape of the fluid passages even if a plurality of membrane separation elements are stacked one upon another. Also the passage for the filtrate fluid is defined by the two elements, and no spacer, or the like, is required for forming such passages.

Figure 4:
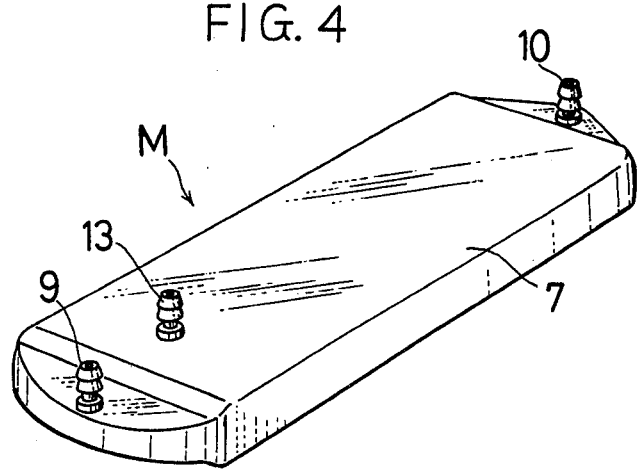
FIG. 4 is a perspective view of a separation module including a membrane separation element according to this invention.

Referring now to FIGS. 4 to 6, there is shown a separation module M comprising a membrane separation element 6, which is equal to that shown at (a) in FIG. 2, and a casing 7 in which the element 6 is enclosed. The element 6 has therein a plurality of mutually crossing passages 8 for the fluid to be treated. A plurality of passages 11 for a filtrate fluid are formed between one side of the element 6 and the casing 7, and likewise, a plurality of passages 12 for the filtrate fluid are defined between the other side of the element 6 and the casing 7. The casing 7 is provided with an inlet 9 and an outlet 10 for the passages 8 for the fluid to be treated, and for example filtrate outlets 13 and 14 for the passages 11 and 12, respectively.

FIGS. 7 and 8 show another separation module Mt comprising a plurality of membrane separation elements 6t stacked one upon another in a casing 7t so that the parallel passages for the filtrate fluid defined by one element cross those defined by another. In other respects, the module Mt substantially duplicates the device hereinabove described.

The separation module M or Mt can, for example, be used for hemofiltration in a circuit as shown in FIG. 9. In the arrangement shown in FIG. 9, blood is drawn from the artery A by a blood pump 15, and filtered by the module Mt, and the blood thus purified and supplied with appropriate quantity of substitution fluid 18. The filtrate fluid separated by the module Mt is discharged. Also these modules M and Mt are usable for dialyzing various fluids.

EXAMPLE

The separation module shown in FIGS. 4 to 6 was tested for purification of bovine blood. The test results are shown in the following table:

TABLE

| | UFR*1 $Q_B$*2 | | Pressure drop (mm Hg) | | Hemolysis ratio*3 |
|---|---|---|---|---|---|
| | 90 min. | 280 min. | 90 min. | 280 min. | 270 min. |
| [Experimental Example 1] Corrugated membranes*4 having fluid passages crossing at an angle of 60° | 0.52 | 0.47 | 140 | 140 | 1.29 |
| [Comparative Example 1] Flat membrane*5 and corrugated membrane | 0.41 | 0.43 | 160 | 160 | 1.15 |
| [Comparative Example 2] Two flat membranes and a corrugated spacer*6 disposed therebetween | 0.43 | 0.37 | 170 | 180 | 1.25 |

*1UFR: Ultrafiltration rate (water permeation rate, ml/min.);
*2$Q_B$: Blood flow rate (3.4 ml/min.);
*3Hemolysis ratio: Ratio of the concentration of free hemoglobin in the bovine blood passed through the device to that passed through the device in which the element is removed;
*4Corrugated membrane: Semipermeable membrane of cellulose acetate having an original thickness of 200 microns and corrugated thickness of 255 microns, a width of 44 mm and a length of 200 mm, and formed with corrugations having a pitch of 900 microns and a passage height of 100 microns;
*5Flat membrane: Equal to the corrugated membrane, except that it had no corrugation;
*6Spacer: An original thickness of 80 microns and corrugated thickness of 155 microns; Passage height = 75 microns; Material = Polyamide.

What is claimed is:

1. A membrane separation element for filtering a fluid, comprising an inlet, an outlet, and a pair of corrugated semipermeable membranes, each of said membranes having an active surface side and another side, each of said membranes defining a plurality of parallel passages for the fluid to be filtered on the active surface side thereof, and a plurality of parallel passages for the filtrate fluid on the other side thereof, said membranes being placed on each other in such a manner that the passages on the active surface side of one of said membranes face and cross the passages on the active surface side of the other membrane, said membranes being sealed together along a pair of opposite edges which are parallel to the direction in which the fluid to be filtered flows from the inlet to the outlet of said element.

2. An element as set forth in claim 1, wherein each of said membranes is formed with corrugations having a height of about 50 to 400 microns, and a pitch of about 600 to 3000 microns.

3. An element as set forth in claim 1, wherein the passages on the active surface side of said one membrane cross the passages on the active surface side of said other membrane at an angle of about 30° to 90°.

4. An element as set forth in claim 3, wherein said angle is in the range of 45° to 90°.

5. An element as set forth in claim 1, wherein each of said membranes has a backing on said other side thereof.

6. An element as set forth in claim 5, wherein said membrane has a semipermeable layer thickness of about 50 to 200 microns, and wherein said backing and said semipermeable layer have a combined thickness of about 150 to 600 microns.

7. An element as set forth in claim 1, wherein said sealed edges define therebetween a gradually varying transverse element width.

8. An element as set forth in claim 7, wherein said width gradually increases or decreases.

9. An element as set forth in claim 7, wherein said sealed edges form a circle.

10. An element as set forth in claim 1, and adapted for use in blood filtration.

11. A membrane separation element as set forth in claim 1, further comprising a casing in which said element is sealingly mounted, said casing and each side of said element defining therebetween the passages for said filtrate fluid, said casing being provided with inlet and outlet means for the passages for the fluid to be filtered, and outlet means for the passages for said filtrate fluid.

12. A plurality of membrane separation elements as set forth in claim 1, further comprising a casing in which said elements are sealingly mounted in such a manner that the passages for said filtrate fluid defined by one of said elements face and cross those defined by another, the passages for the filtrate fluid being defined between said casing and said elements, and also between every adjoining two of said elements, said casing being provided with inlet and outlet means for the passages for the fluid to be filtered and outlet means for the passages for the filtrate fluid.

* * * * *